INVENTOR
Robert W. McCloy

United States Patent Office 3,430,446
Patented Mar. 4, 1969

3,430,446
EXTERNAL BURNING RAMJET ENGINE
Robert W. McCloy, Urbana, Ill., assignor to the United States of America as represented by the Secretary of the Navy
Filed Apr. 20, 1964, Ser. No. 361,628
U.S. Cl. 60—270    7 Claims
Int. Cl. F02k 7/10

This invention relates generally to ramjet engines; more particularly, it relates to an improved ramjet engine utilizing partially external air compression and combustion gas expansion, and capable of operation at hypersonic speeds.

Conventional ramjet engines consist of a cylindrical duct within which air is compressed and fuel is injected and burned, and out of which the resultant reaction gases flow through a conventional exhaust nozzle. Such engines have received widespread use and perform satisfactorily for most applications. However, while there is no theoretical limit upon the speeds attainable therewith, it has been found that the increasingly high temperatures present within the duct as speeds extend further into the supersonic range pose cooling problems which place a practical limit on the usefulness of such conventional ramjets. In an attempt to simplify the ramjet engine and to solve the problems associated with cooling the engine structure at high speeds, the external burning ramjet engine has recently been conceived.

The external burning ramjet engine in its simplest form consists of an inverted wedge, the wedge being defined by a front compression ramp and a rear expansion ramp, both said ramps being inclined downwardly from the horizontal with the confronting edges thereof defining the peak, or knee, of the inverted wedge. The engine is flown in a supersonic air stream, and the front ramp functions as an external diffuser to compress the air flowing thereover. Fuel is added to the compressed air flow just ahead of the knee and is burned under the rear ramp. The burning gases expand under said rear expansion ramp, thereby creating lift and thrust.

Because all combustion takes place externally in the external burning ramjet, cooling problems are at a minimum. However, it has been found that shock waves are formed by injection and combustion of the fuel. These shock waves act adversely upon the air flowing thereover, and hence reduce the engine's efficiency. The problem is especially acute as speeds extend into the hypersonic region. No successful method has yet been proposed for eliminating these shock waves, and accordingly the usefulness of the simple external burning ramjet engine is also limited.

In the present invention structural features of the external burning ramjet and the conventional duct ramjet are combined to produce an engine in which partial external compression of the air and partial external expansion of the burning gases occur, and in which the shock waves associated with fuel injection and combustion are utilized to advantage.

The principal object of this invention, therefore, is to provide a ramjet engine so constructed as to be capable of efficient operation at hypersonic speeds, and in which partially external compression of the air flow and partially external expansion of combustion gases are utilized to reduce structural cooling problems.

Another object of the invention is to provide a ramjet engine so constructed as to utilize to advantage shock waves associated with fuel injection and combustion.

A further object of the invention is to provide a ramjet engine so constructed as to be capable of accelerating very large payloads from near sonic speed to an orbital velocity of about Mach 29.

It is also an object of this invention to provide a ramjet engine that is uncomplicated in structure and relatively easy to cool.

Other objects and many of the attendant advantages of this invention will be readily appreciated as the same becomes better understood by reference to the following detailed description when considered in connection with the accompanying drawings, wherein.

The ramjet engine of the present invention is two dimensional in form, and includes a front downwardly inclined compression ramp, a duct section defined by the opposed flat surfaces of the main engine body and a cowl, and a rear upwardly inclined expansion ramp. The engine is flown in a supersonic air stream, and air is compressed by the front ramp, passes into the duct where it is further compressed, and is mixed with fuel. The mixture of air and fuel burns and expands under the rear expansion ramp, producing thrust and lift.

Figure 3:
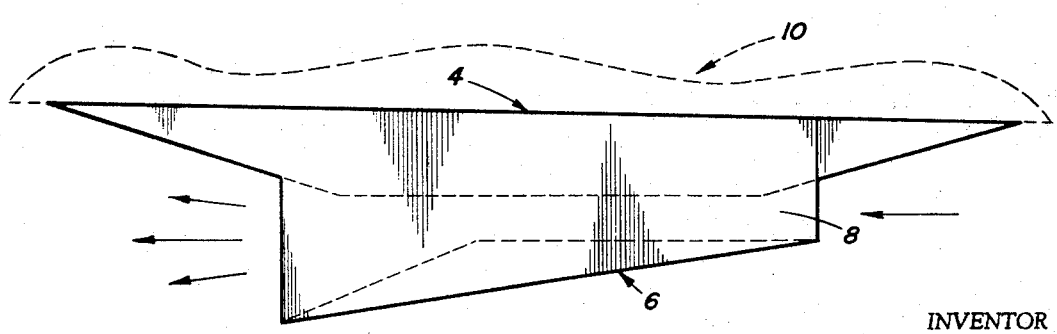
FIG. 3 is a side elevation of the engine of FIG. 2 showing the general configuration thereof.

Referring now to the drawings, a ramjet engine is indicated at 2 and includes a main body 4, a cowl 6, and a pair of side plates 8 which function to connect the cowl 6 in spaced relationship with the body 4. An airframe to which the engine is attached is indicated by broken lines at 10 in FIG. 3.

Figure 4:
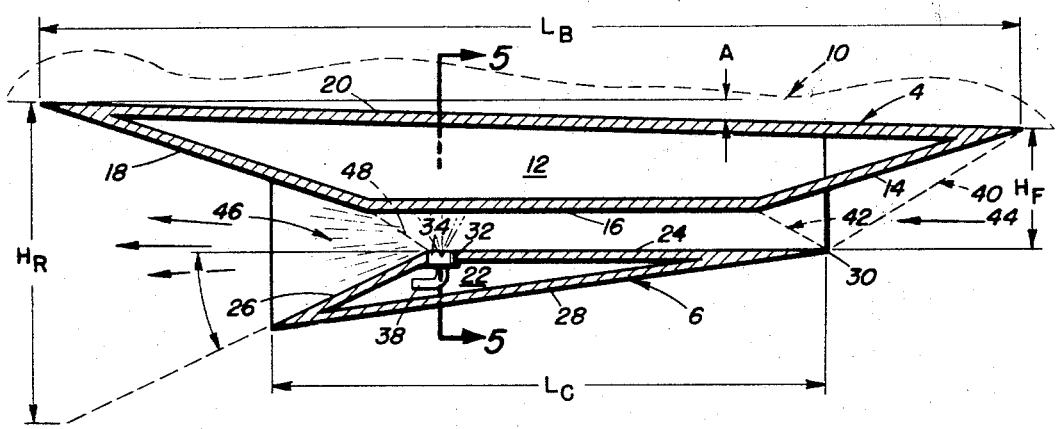
FIG. 4 is an axial section taken on line 4—4 of FIG 1, showing in diagrammatic form the construction and operation of the ramjet engine of the invention.
Figure 5:
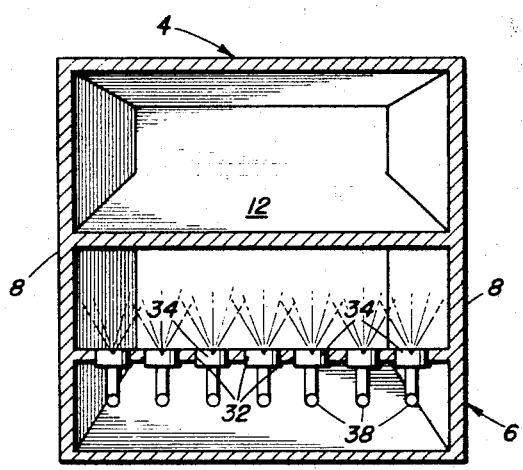
FIG. 5 is a sectional view, in enlarged scale, taken on the line 5—5 of FIG. 4, showing the internal configuration of the passages.

As is shown in FIG. 4, the body 4 has a hollow interior 12, and includes an inclined front compression ramp 14, a horizontal central portion 16, and an inclined rear expansion ramp 18. The top surface 20 of the engine body is inclined at a small angle A to the horizontal whereby to permit the rear ramp 18 to be larger in size than the front ramp 14. In the drawing, ramps 14 and 18 are both at an angle of about 15 degrees to the horizontal. The exact angle employed would be dependent upon the desired operating characteristics of the engine.

The cowl 6 has a hollow interior 22, and includes a horizontal upper surface 24, an inclined expansion ramp 26, and an inclined bottom plate 28. The leading edge 30 of the cowl forms a knife edge.

The surface 24 has a plurality of aligned ports 32 extending thereacross just ahead of where said surface joins expansion ramp 26. Each port 32 is fitted with a fuel nozzle 34, each of which in turn is connected to a conduit 38. The nozzles 34 are connected by suitable conduits 38 to fuel tanks (not shown), which may be disposed within the interior 12 of body 4 or within the airframe 10.

The engine shown in the drawings is designed to operate best at one specific speed, say Mach 10. When the engine is moving through the atmosphere at said design speed an oblique shock wave 40 will attach to its leading edge. The cowl 6 is so positioned relative to the body 4 that the shock wave 40 will impinge upon edge 30. The wave 40 will be reflected by said edge 30, forming a second shock wave 42 which impinges at the point where ramp 14 meets ramp 16, the cowl being so positioned relative to the body 4 as to insure such impingement. Thus, air approaching the engine at 44 is turned and compressed by shock wave 40 to flow generally parallel to front ramp 14. The air then passes through shock wave 42, which causes further compression and which again turns the direction of flow, whereby the air is directed horizontally through the duct defined by opposed surfaces 16 and 24 and side plates 8. The air flow, while reduced in speed below free stream velocity, is still flowing at several times sonic velocity.

The duct serves to straighten and even the supersonic air flow prior to addition of fuel. Fuel, such as liquid hydrogen, is injected into the air-stream through ports 32. The fuel utilized is preferably one that is self-igniting upon contact with the compressed, supersonic airstream. The fuel-air mixture rapidly burns to completion, and the burning gases 46 expand over expansion ramps 18 and 26, producing lift and thrust.

The burning gases 46 create a shock wave 48, which extends across the duct from the line of fuel ports 32 to impinge at the point where the ramps 16 and 18 meet. Thus, incoming air must pass through the flame-induced shock wave 48 in order to reach the combustion zone 46. The air, in passing through the shock wave 48, is still further compressed, and hence the operating efficiency of the engine is substantially greater than would be the case if no flame-induced shock wave were present.

The present invention is intended for use in boosting very large payloads from about Mach 5 up to orbital velocities. By way of example, the body length $L_B$ of such an engine might be 150 feet, the cowl length $L_C$ 90 feet, the air inlet height $H_F$ 5 feet, and the gas exhaust height $H_R$ 10 feet. Such an engine, utilizing liquid hydrogen as a fuel, can attain an average fuel specific impulse of 1500 pounds thrust per pound of fuel per second over a speed range from Mach 3 to Mach 29, which is several times greater than is obtainable from conventional ramjets and from many known types of rockets.

If the ramjet engine of the invention is to operate at peak efficiency over its entire velocity range, it is obvious that the position of the cowl 6 must be alterable because of changes that occur in the angle of shock wave 40 as the Mach range is traversed. While the engine in the drawings is not shown to be capable of such alterations, the specific structure for accomplishing the same is not considered to be a part of the invention.

Figure 1:
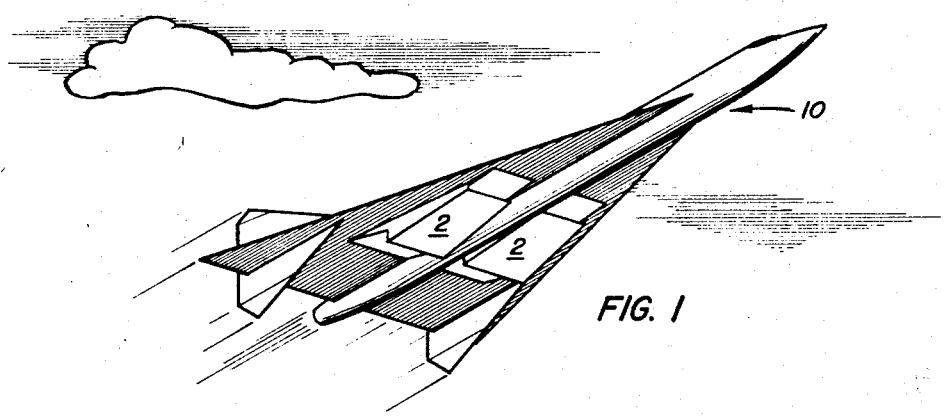
FIG. 1 is a perspective view of an aircraft propelled by a pair of ramjet engines.
Figure 2:
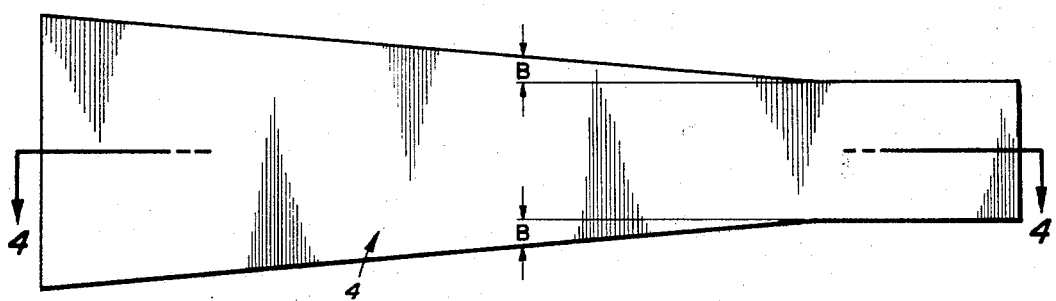
FIG. 2 is a top plan view of the ramjet engine of the invention.

In FIG. 2, the sides of the ramjet engine are shown to be flared outwardly. Such flaring is found to be desirable for speeds in excess of about Mach 2.5, as it tends to increase engine performance characteristics by reducing the total wave drag. The angle B of flaring is exaggerated in the drawings, and normally is only a few degrees.

At lower Mach numbers, say under Mach 3, it may be desirable not to consume all the air passing through the engine, thus economizing on fuel and reducing cooling problems. When high acceleration is desired, however, all air flowing through the engine will be consumed.

Obviously, many modifications and variations of the present invention are possible in the light of the above teachings. It is therefore to be understood that within the scope of the appended claims the invention may be practiced otherwise than as specifically described.

What is claimed is:

1. In an external burning ramjet engine wherein the improvement comprises:
   a main body portion;
   said body portion including a front downwardly inclined ramp;
   a rear upwardly inclined ramp;
   said forward inclined ramp and said rear inclined ramp being interconnected by an upper and lower central portion;
   said upper central portion being inclined downward at its forward end;
   said lower central portion being substantially horizontal;
   a cowl spaced from said lower central portion to form an air passageway therebetween;
   said cowl fixedly secured to said body portion by a pair of side plates;
   said cowl having a horizontal portion parallel to said lower central portion of said body;
   said cowl having a downwardly extending ramp at its rear end;
   fuel injection means located at the rearmost portion of said horizontal portion;
   said cowl spaced from said main body in such a manner that air entering said passageway is compressed by a first shock wave that is formed when air contacts the leading edge of said main body;
   said entering air being reflected and forms a second shock wave when said air impinges on the leading edge of said cowl;
   said entering air is again reflected horizontally through said passageway;
   as the air reaches said fuel injection takes place and the burning gases expand over said rearward ramps thus producing lift and thrust.

2. In an external burning ramjet wherein the improvement comprises:
   a main body portion;
   said body including a front downwardly inclined ramp;
   said body having a rear upwardly inclined ramp;
   an upper and lower central portion interconnecting said forward and rear ramps;
   a cowl suspended from said main body portion and providing an air passageway therebetween; said cowl having a horizontal portion parallel to said lower central portion of said body;
   fuel injection means mounted in said horizontal portion;
   said cowl being spaced from said main body in such a manner that air entering said passageway is compressed by a plurality of shock waves formed at the entrance to said passageway;
   whereby ignition of the fuel takes place and the burning gases expand over said rearward ramps thus imparting lift and thrust to said engine.

3. In a device of the character described in claim 2 wherein said fuel injection means comprises:
   a plurality of spaced fuel injection nozzles across the width of said horizontal portion.

4. In an external burning ramjet engine wherein the improvement comprises:
   a main body portion;
   forward and rear ramp means extending from said main body portion with a horizontal center portion therebetween;
   cowl means suspended from said main body portion and forming an air passageway therebetween;
   fuel injection means mounted in said cowl means whereby air entering said passageway is compressed prior to the injection of fuel thus imparting thrust and lift to said engine.

5. In a device of the character described in claim 4 wherein said forward ramp means comprises:
   an inclined ramp which is substantially longer than said rear ramp and the width of which is substantially less than that of said rear ramp.

6. In an engine of the character described in claim 4 wherein:
   said cowl means is attached to said main body portion by a pair of side plates;
   said cowl means having a rearwardly inclined ramp means extending therefrom;
   said inclined ramp means of said cowl means being substantially the same width as said rear ramp means of said main body portion.

7. In a device of the character described in claim 6 wherein:
   said fuel injection means comprises a plurality of spaced fuel nozzles for injecting fuel into said air passageway;

said nozzles positioned in said cowl means immediately upstream of said cowl rear ramp means.

References Cited

UNITED STATES PATENTS

| | | | |
|---|---|---|---|
| 2,735,263 | 2/1956 | Charshafian | 60—35.6 |
| 2,916,230 | 12/1959 | Nial | 244—15 |
| 3,027,118 | 3/1962 | Willox | 60—35.6 |
| 3,040,516 | 6/1962 | Brees | 60—35.6 |
| 3,161,379 | 12/1964 | Lane | 60—35.6 |

SAMUEL FEINBERG, *Primary Examiner.*

U.S. Cl. X.R.

244—15, 130